United States Patent
Scharp

(10) Patent No.: US 6,772,846 B1
(45) Date of Patent: Aug. 10, 2004

(54) METHOD FOR DRILLING SHAKER BORES INTO THE COOLING CHANNEL OF A SINGLE-PART PISTON

(75) Inventor: Rainer Scharp, Waiblingen (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 10/384,008

(22) Filed: Mar. 7, 2003

(30) Foreign Application Priority Data

Jan. 16, 2003 (DE) .......................................... 103 01 367

(51) Int. Cl.[7] .................................................. F02F 3/22
(52) U.S. Cl. ........................ 173/1; 29/888.049; 29/558; 92/186; 123/193.6
(58) Field of Search .......................... 173/1; 29/888.04, 29/888.049, 557, 558; 123/193.6, 41.35; 92/216, 222, 186, 159, 190

(56) References Cited

U.S. PATENT DOCUMENTS 3,464,100 A * 9/1969 Foulet ................... 29/888.045
4,608,947 A * 9/1986 Stadler .................... 123/41.39
5,052,280 A * 10/1991 Kopf et al. .................... 92/186
5,144,923 A * 9/1992 Leites et al. ............. 123/193.6
5,261,363 A * 11/1993 Kemnitz .................. 123/193.6
5,778,533 A * 7/1998 Kemnitz ................ 29/888.049
6,487,773 B1 * 12/2002 Scharp et al. ............ 29/888.04
6,698,392 B1 * 3/2004 Kohnert et al. .......... 123/193.6

FOREIGN PATENT DOCUMENTS

DE  104 44 512.5    9/2001
WO  WO02/076672    3/2002

* cited by examiner

Primary Examiner—Scott A. Smith
(74) Attorney, Agent, or Firm—Collard & Roe, P.C.

(57) ABSTRACT

A method for drilling shaker bores into a cooling channel of a single-part piston, in which gudgeon-pin bosses each having a gudgeon-pin bore and piston shaft elements are molded onto the piston head via a tie-up substantially extending fully around in the form of a ring. Passage bores are drilled into the tie-up coaxially with the shaker bores to be drilled into the cooling channel, and the shaker bore is drilled into the underside of the piston head with a drilling bit inserted in the respective passage bore.

6 Claims, 1 Drawing Sheet

METHOD FOR DRILLING SHAKER BORES INTO THE COOLING CHANNEL OF A SINGLE-PART PISTON

BACKGROUND OF THE INVENTION

1. Field of the Invention

The invention relates to a method for drilling shaker bores into the cooling channel of a single-part piston.

2. The Prior Art

A single-part piston with a cooling channel is described in International Patent Application No. PCT/EP02/02381. In the piston shown in this application, the bosses of the gudgeon pin and the elements of the piston shaft are connected with the piston head via a substantially ring-shaped tie-up. Although this piston has a recess extending fully around below the cooling channel, there is no known method that would permit producing shaker bores in the cooling channel of the one-part cooling channel-piston as known from the prior art cited above that extend in the direction of the piston crown in order to enhance the cooling of the piston crown.

Producing such shaker bores in a multipart cooling channel-piston is described in German patent application DE 102 44 512.5, which is comprised of a bottom part and a top part of the piston, with a cooling channel that is open downwards, by drilling such shaker bores into the cooling channel in the direction of the piston crown before the upper part of the piston is mounted on the top part of the piston, whereby the cooling channel is then sealed as well.

SUMMARY OF THE INVENTION

It is therefore an object of the invention to provide a method that permits drilling shaker bores into the cooling channel of a single-part piston where the gudgeon-pin bosses and elements of the piston shaft are mechanically tied to the upper part of the piston for stability reasons, for the purpose of enhancing the cooling of the piston crown.

This object is accomplished by a method for drilling shaker bores into a cooling channel arranged on the side of the piston head facing away from the piston crown of a single-part piston, wherein gudgeon-pin bosses, each having a gudgeon-pin bore and piston shaft elements, are molded onto the side of the piston head facing away from the piston crown via a tie-up substantially extending fully around. In the method according to the invention, passage bores are drilled into the tie-up coaxially with the shaker bores to be drilled into the cooling channel. A drilling bit having a diameter smaller than the diameter of the passage bore is inserted into the passage bores. The corresponding shaker bore is drilled into the underside of the piston head with the drilling bit inserted in the respective passage bore.

Preferably, at least a part of the axes of the shaker bores extend parallel with the axis of the piston, or at an acute angle in relation to the axis of the piston. The shaker bores preferably have a cylindrical shape or the form of an oblong hole and are radially symmetrically and/or asymmetrically distributed over the circumference of the cooling channel.

An alternative embodiment of the process is as follows: In a first production step, passage bores are drilled with a first drilling bit into the tie-up and the shaker bores are produced in the cooling channel. In a second production step, using a drilling bit with a diameter larger than the one of the first drilling bit, the passage bores are enlarged and the burrs of the shaker bores are subsequently removed.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figures 1, 2:
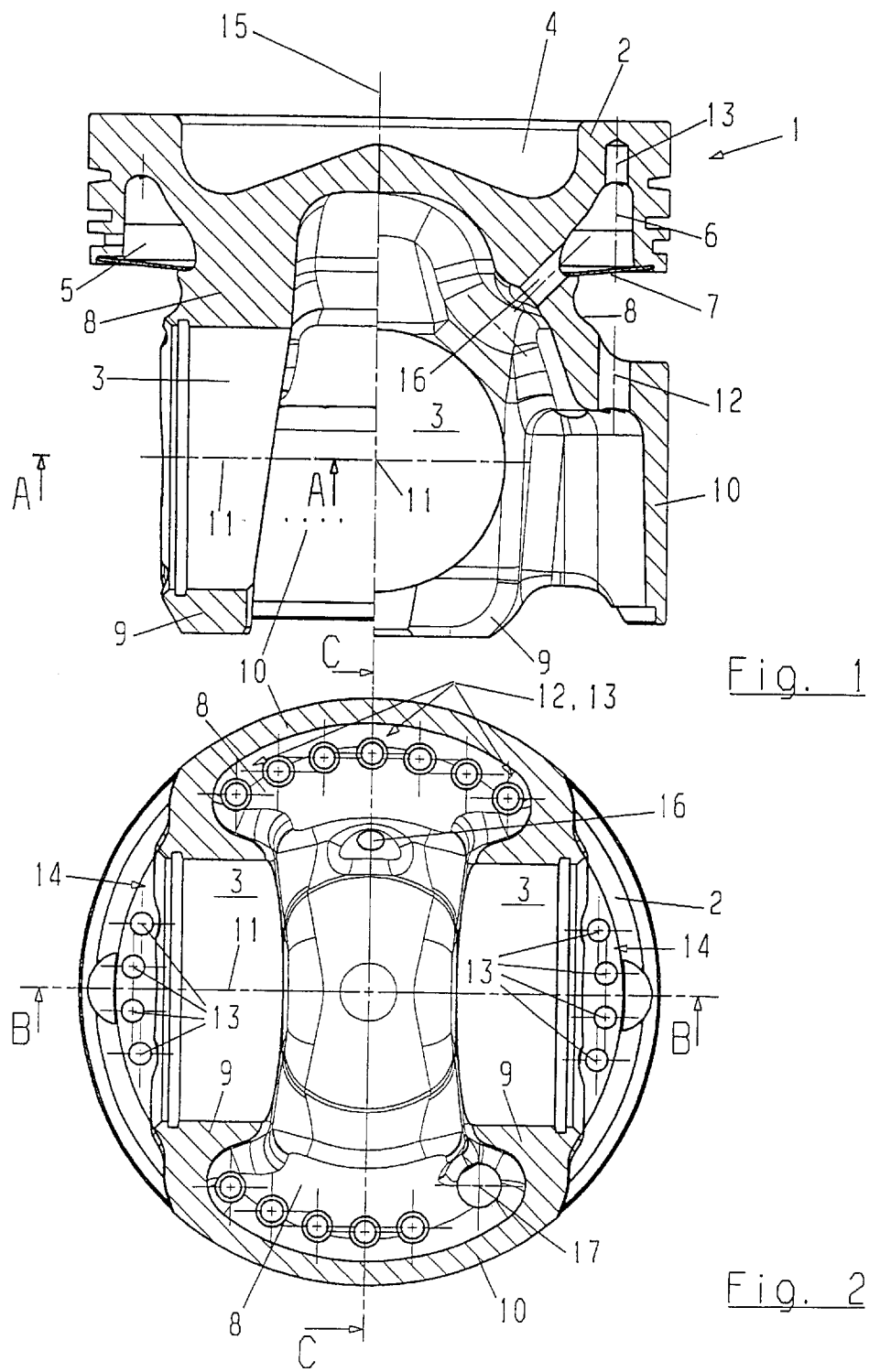
FIG. 1 shows a composed sectional view of a single-part piston as defined by the invention. The left half of this figure is a cross section through the piston along line B—B in FIG. 2, and its right half represents a cross section through the piston along line C—C in FIG. 2.
FIG. 2 is a section through the piston as defined by the invention that is extending along the longitudinal axis of the gudgeon pin boss in parallel with the piston head.

Referring now in detail to the drawings, FIG. 1 shows a single-part piston 1 whose piston head 2, on the side facing away from the gudgeon pin boss 9, comprises a combustion chamber 4, and, on the side facing gudgeon-pin boss 9, a cooling channel 5 arranged near the edge of piston head 2. Cooling channel 5 consists of a recess 6 that is worked into the edge of piston head 2 and is open in the direction of gudgeon-pin boss 9. This recess is sealed, for example by a cover ring 7 in the form of a plate spring that is divided in two parts. Cover ring 7 is mounted in the pre-stressed condition in supports on piston head 2.

Via a tie-up 8 that is located on all sides on the inner side of cooling channel 5 and substantially extending in the form of a ring, piston head 2 is mechanically connected with two gudgeon pin bosses 9 each having a gudgeon pin bore 3, and piston shaft elements 10 on the pressure and counter pressure sides, both according to the left half of FIG. 1 (section B—B in FIG. 2) and according to the right half of FIG. 1 (section C—C in FIG. 2).

FIG. 2, which is a section along the longitudinal axis 1 of gudgeon pin bore 3 in the direction A—A, shows the underside of piston head 2 and, in the area of the piston shaft elements 10, the underside of tie-up 8 of piston shaft 10 on piston head 2. Through-extending bores 12 are drilled into tie-up 8 of the piston shaft 10. FIGS. 1 and 2 show that these bores are arranged coaxially with shaker bores 13 that are drilled into the underside of piston head 2. Shaker bores 3 can be seen here because cover 7 was omitted in the representation according to FIG. 2. Additional shaker bores 13 drilled into the underside of piston head 2 are located in the area of front side 14 of the gudgeon pin bosses 9; their arrangement and number are freely selectable depending on the requirements in the given case.

The function of shaker bores 13 on the underside of the piston head 2 consists in forming shaking spaces for the cooling oil present in the cooling channel 5. As piston 1 moves back and forth in the direction of axis 15 of the piston, these shaker spaces are filled with cooling oil and thus heighten the cooling effect of the cooling oil. A channel 16 serves as a drain for the cooling oil present in cooling channel 5, the cooling oil being received in cooling channel 5 via a feed/drain opening 17 (FIG. 2).

Except for the drilling of bores 12 and 13, the manufacture of piston 1, which is made of steel or an aluminum alloy than can be forged, is described in PCT application no.

PCT/EP02/02381. The drilling of shaker bores 13, which are arranged near front sides 14 of gudgeon pin bosses 9, is carried out in a manner known from German patent application DE 102 44 511.7. Problems arise when shaker bores 13 are drilled. Viewed in the direction A—A, these shaker bores are located downstream of tie-up site 8, viewed in the direction A—A.

According to the present invention, this problem is solved in that passage bores 12, which have a defined diameter, are drilled first into tie-up 8 of the piston shaft elements in suitable locations. Thereafter, shaker bores 3 are drilled into the underside of piston head 2 coaxially with passage bores 12 by inserting in the passage bores drilling bits that are intended for that purpose and have a diameter smaller than the diameter of passage bores 12, before shaker bores 3 are then drilled into the underside of piston head 2 coaxially with the passage bores 12.

As an alternative to the above, it is possible to first drill passage bores 12 in suitable locations into tie-up 8 of the piston shaft elements 10, using a first drilling bit with an adequate length, and to then drill in the same production step shaker bores 13 into recess 6 of cooling channel 5 from the bottom. Subsequently, using a second drilling bit with a larger diameter than the one of the first drilling bit, passage bores 12 are first enlarged and the burrs of the edges of shaker bores 13 are then removed.

Accordingly, while only a few embodiments of the present invention have been shown and described, it is obvious that many changes and modifications may be made thereunto without departing from the spirit and scope of the invention.

List of Reference Numerals

1 Piston
2 Piston head
3 Gudgeon-pin bore
4 Combustion chamber
5 Cooling channel
6 Recess
7 Cover
8 Tie-up
9 Gudgeon-pin boss
10 Piston shaft element
11 Longitudinal axis of gudgeon-pin bore
12 Passage bore
13 Shaker bore
14 Front side of gudgeon-pin boss 9
15 Piston axis
16 Channel
17 Feed/drain opening

What is claimed is:

1. A method for drilling shaker bores into a cooling channel arranged on a side of a piston head facing away from a piston crown of a single-part piston, wherein gudgeon-pin bosses each having a gudgeon-pin bore and piston shaft elements are molded onto the side of the piston head facing away from the piston crown via a tie-up substantially extending fully around, comprising:

drilling passage bores into the tie-up;

inserting a drilling bit having a diameter smaller than a diameter of the passage bores into the passage bores; and drilling shaker bores into an underside of the piston head with the drilling bit inserted in each passage bore, each of said shaker bores being coaxial with the respective passage bore.

2. The method according to claim 1, wherein the shaker bores have axes, at least some of which extend parallel with an axis of the piston.

3. The method according to claim 1, wherein the shaker bores have axes, at least some of which extend at an acute angle in relation to an axis of the piston.

4. The method according to claim 1, wherein the shaker bores have a cylindrical shape or the form of an oblong hole.

5. The method according to claim 1, wherein the shaker bores are radially symmetrically or asymmetrically distributed over a circumference of the cooling channel.

6. A method for drilling shaker bores into a cooling channel arranged on a side of a piston head facing away from a piston crown of a single-part piston, wherein gudgeon-pin bosses each having a gudgeon-pin bore and piston shaft elements are molded onto the side of the piston head facing away from the piston crown via a tie-up substantially extending fully around, comprising:

drilling passage bores into the tie-up and drilling the shaker bores in the cooling channel with said first drilling bit;

enlarging the passage bores using a drilling bit with a diameter larger than a diameter of the first drilling bit; and subsequently removing burrs of the shaker bores.

* * * * *